(12) United States Patent
Dasgupta et al.

(10) Patent No.: US 11,486,748 B2
(45) Date of Patent: Nov. 1, 2022

(54) ELECTROMAGNETIC FLOWMETER HAVING CONCENTRIC COILS

(71) Applicant: ABB SCHWEIZ AG, Baden (CH)

(72) Inventors: Subhashish Dasgupta, Bangalore (IN); Simon Draper, Cheltenham (GB); Graham Watson, Gloucestershire (GB)

(73) Assignee: ABB Schweiz AG, Baden (CH)

( * ) Notice: Subject to any disclaimer, the term of this patent is extended or adjusted under 35 U.S.C. 154(b) by 111 days.

(21) Appl. No.: 16/976,605

(22) PCT Filed: Feb. 18, 2019

(86) PCT No.: PCT/IB2019/051280
§ 371 (c)(1),
(2) Date: Aug. 28, 2020

(87) PCT Pub. No.: WO2019/166908
PCT Pub. Date: Sep. 6, 2019

(65) Prior Publication Data
US 2021/0010838 A1  Jan. 14, 2021

(30) Foreign Application Priority Data
Feb. 28, 2018 (IN) .............................. 201841007563

(51) Int. Cl.
*G01F 1/58* (2006.01)
*G01F 15/06* (2022.01)
(52) U.S. Cl.
CPC .............. *G01F 1/586* (2013.01); *G01F 1/584* (2013.01); *G01F 15/06* (2013.01)
(58) Field of Classification Search
None
See application file for complete search history.

(56) References Cited

U.S. PATENT DOCUMENTS

| 3,503,258 | A | 3/1970 | Baker | |
| 6,237,424 | B1 * | 5/2001 | Salmasi | .................... G01F 1/58 |
| | | | | 73/861.11 |

(Continued)

FOREIGN PATENT DOCUMENTS

| AU | 2011348795 | 7/2013 |
| CN | 204694303 U | 10/2015 |

(Continued)

OTHER PUBLICATIONS

International Search Report for PCT/IB2019/051280 dated May 31, 2019, 3 pages.

(Continued)

*Primary Examiner* — Harshad R Patel
(74) *Attorney, Agent, or Firm* — Leydig, Voit & Mayer, Ltd.

(57) ABSTRACT

The present invention relates to an electromagnetic flowmeter. The present invention provides an electromagnetic flowmeter for measuring flow of fluid flowing in a conduit of the electromagnetic flowmeter, wherein the electromagnetic flowmeter comprises: a pair of electrodes mounted on the conduit for measuring potential difference generated by the interaction of electromagnetic field in the fluid to determine the flow of fluid in the electromagnetic flowmeter; a processing unit, wherein the processing unit acquires signals from the pair of electrodes and processes the signal for measurement, a set of coils comprising at least two coils mounted on a surface of the conduit and excited by an excitation unit for generating an electromagnetic field, wherein a first coil from the set of coils is concentrically positioned with a second coil from the set of coil, and the second coil is placed within the enclosed surface area of the first coil.

5 Claims, 3 Drawing Sheets

(56) References Cited

U.S. PATENT DOCUMENTS 7,779,702 B2 8/2010 Shanahan
2016/0061856 A1 3/2016 Marsh

FOREIGN PATENT DOCUMENTS

GB 990484 4/1965
JP 5677964 B2 1/2015

OTHER PUBLICATIONS

International Preliminary Report on Patentability for PCT/IB2019/051280 dated Sep. 1, 2020, 7 pages.
First Examination Report for IN 201841007563 dated Dec. 30, 2019, 6 pages.

* cited by examiner

ELECTROMAGNETIC FLOWMETER HAVING CONCENTRIC COILS

FIELD OF THE INVENTION

The present invention relates generally to an electromagnetic flowmeter for measuring flow of fluid and more particularly to a compact electromagnetic flowmeter.

BACKGROUND OF THE INVENTION

Measurement of flow of fluids through a conduit or pipe can be done by numerous ways like using electromagnetic flowmeters. A typical electromagnetic flowmeter works on Faraday's law of electromagnetic induction. An electromagnetic field is imposed within a flow pipe having a flow of fluid with a certain level of conductivity. Electromotive force (EMF) induced as a result of the interaction of the electromagnetic field with fluid molecules (ions in the fluid), is measured using electrodes provided at the pipe side walls. The measured EMF is proportional to the flowrate and thus used to measure flowrate. While electromagnetic flowmeters are attractive given that they have high accuracy and simplistic in construction, it is desirable to reduce the material cost and/or weight of the flowmeters and provide for a more compact electromagnetic flowmeter with minimal impact on signal strength.

The imposition of magnetic field is done using copper coils by electrically exciting the copper coils. The sensitivity of the electromagnetic flowmeter is directly influenced by placement of these copper coils and inserts. Also, the shape of coils play an important role in the performance (e.g. sensitivity, accuracy, linearity) of the electromagnetic flow meter. Most electromagnetic flowmeters conventionally use saddle shaped coils for magnetic field generation. These coils, whatever be the shape, needs to be mounted on the surface within the electromagnetic flowmeter and be closer to the fluid passing through the electromagnetic flowmeter.

Conventionally, two electromagnetic coils of the same dimensions, shape and size are provided, one each at the top and bottom of a liner or insulating pipe that carries the fluid that is to be measured. A pair of electrodes are inserted at the sides of the liner to measure the signal generated and on the basis of the measured signal the flow rate of the fluid is measured. Due to provision of two coils one on top and another at the bottom of the liner the signal strength is adequate for measurement purposes. In case a single coil is used instead of two coils, the cost is reduced due to reduction of material however the signal strength and compactness of the electromagnetic flowmeter is compromised. Other configurations relating to use of coils can also be interesting to provide cost effective, compact packaging of coils in an electromagnetic flowmeter. Such configurations in a compact electromagnetic flowmeter need to provide for an optimal signal strength with reduced usage of material for the coils.

SUMMARY

The above-mentioned shortcomings, disadvantages and problems are addressed herein which will be understood by reading and understanding the following specification.

In one aspect, the present invention provides an electromagnetic flowmeter for measuring flow of fluid flowing in a conduit of the electromagnetic flowmeter, wherein the electromagnetic flowmeter comprises: a pair of electrodes mounted on the conduit for measuring potential difference generated by the interaction of electromagnetic field in the fluid to determine the flow of fluid in the electromagnetic flowmeter; a processing unit, wherein the processing unit acquires signals from the pair of electrodes and processes the signal for measurement; at least one set of coils comprising at least two coils mounted on a surface of the conduit and excited by an excitation unit for generating an electromagnetic field; wherein a first coil from the at least one set of coils is concentrically positioned with a second coil from the set of coil, and the second coil is placed within the enclosed surface area of the first coil.

In an embodiment, the pair of electrodes are positioned between the first coil and the second coil.

In an embodiment the electromagnetic flowmeter further comprising an excitation unit to excite the at least one set of coils for generating an electromagnetic field that interact with the fluid passing through the electromagnetic flowmeter, wherein the excitation unit is controlled by a processing unit.

In an embodiment the electromagnetic flowmeter further comprising a display for indicating the measured flow rate of fluid.

In an embodiment of the electromagnetic flowmeter, the measured flow rate of fluid is transmitted to a remote control centre of the electromagnetic flowmeter for storage or analysis.

DETAILED DESCRIPTION

The present invention provides an electromagnetic flowmeter for measuring flow of fluid and more particularly provides for a more compact electromagnetic flowmeter. It also provides for a coil configuration where two or more coils (a set of coil) can be placed together sharing a surface area in a single location instead of being spread across different locations i.e. the coils are not placed on top and bottom side/portion of the conduit. More than one set of coils, however can be used to create further configurations depending on signal strength requirement to interact with the fluid flow or for detecting certain characteristics of fluid such as multiphase fluid flow or complete filling of fluid conduit or for improved accuracy and sensitivity.

As mentioned earlier, coils are used for inducing an electromagnetic field which in turn leads to measurement of flowrate of fluid passing through a conduit or flow pipe of the electromagnetic flowmeter. These coils which are usually in set of two coils, where each coil is mounted on top of the liner and bottom of the liner that carries the fluid can influence performance and sensitivity of the electromagnetic flowmeter as inducing a strong electromagnetic field for accurate results is dependent on both these coils. However having two coils of the same dimension in an electromagnetic flowmeter can affect the compactness as well as cost of the electromagnetic flowmeter. In order to achieve same level of performance as with having two coils of same dimension the present invention provides for an alternative arrangement of the coils.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1:
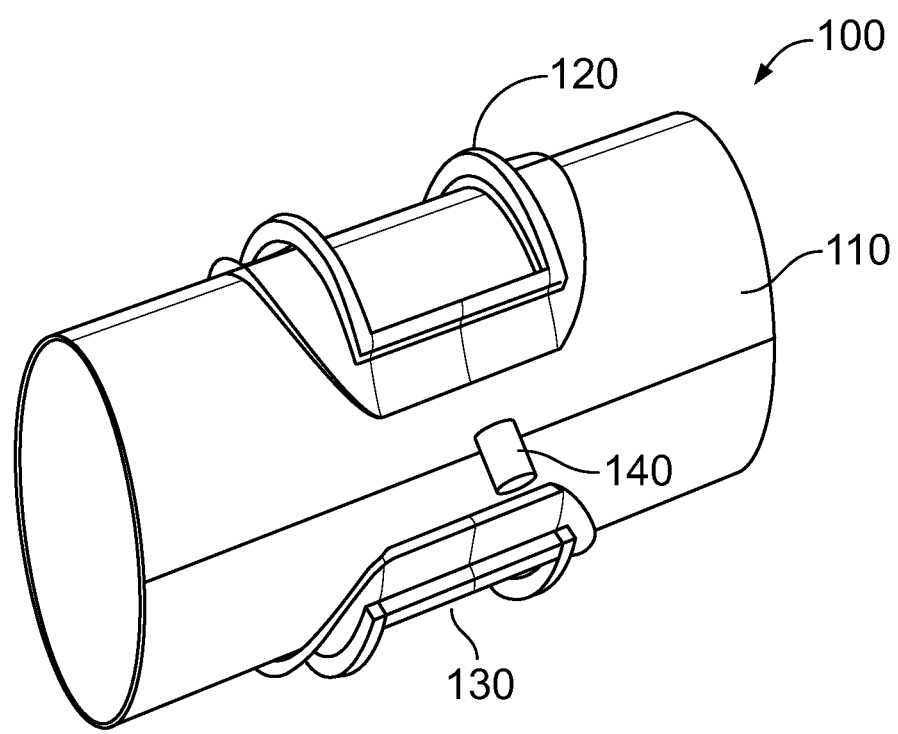
FIG. 1 depicts a typical electromagnetic flowmeter.

FIG. 1 shows an electromagnetic flowmeter 100 for measuring flow of fluid flowing in a conduit 110. Electromagnetic flowmeters can measure flowrate for fluids with some amount of conductivity. As shown in FIG. 1, the electromagnetic flowmeter 100 is provided with a set of coils, a first coil 120 and a second coil 130 mounted onto a conduit lined by an insulating liner carrying the fluid for measurement by the electromagnetic flowmeter. The coils of an electromagnetic flowmeter are electrically excited for generation of an electromagnetic field by an excitation unit, so that the electromagnetic filed interacts with the fluid passing through the conduit 100.

FIG. 1 shows an electrode 140 mounted on the conduit 110 for measuring potential difference generated by the interaction of electromagnetic field in the fluid. FIG. 1 only shows one of the electrodes 140 from a pair of electrodes wherein the other electrode is present on the opposite side of the conduit (not shown). The potential difference measured by the pair of electrodes 140 eventually determines the rate of flow of fluid in the electromagnetic flowmeter 100.

Figure 2:
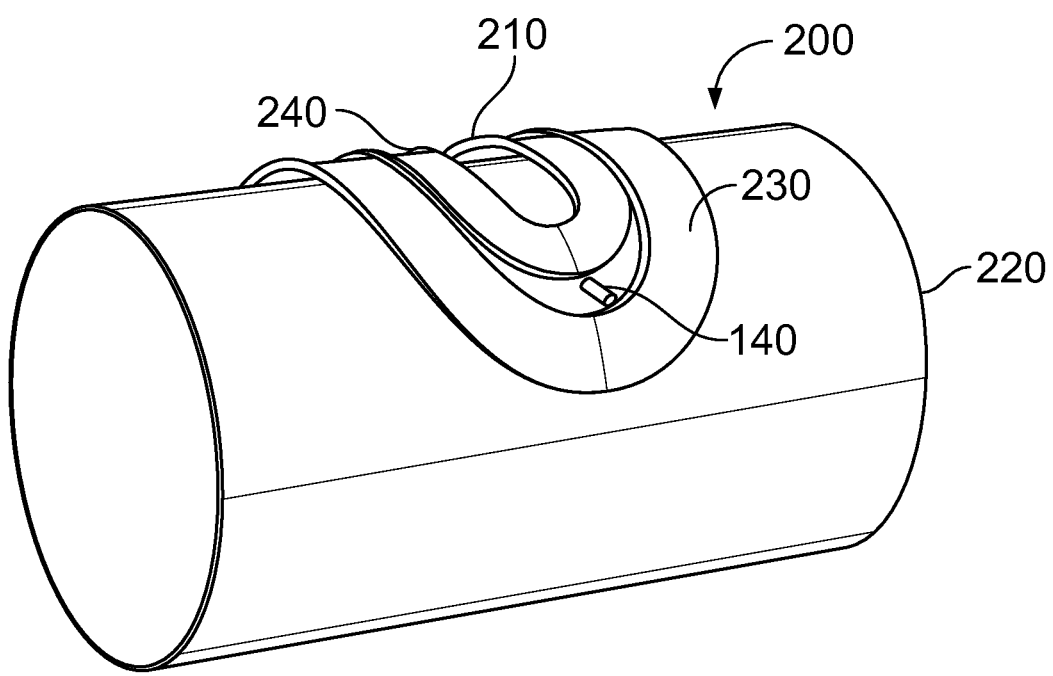
FIG. 2 depicts an electromagnetic flowmeter in accordance with an embodiment of the present invention.

FIG. 2 shows an electromagnetic flowmeter 200 in accordance to an embodiment of the present invention wherein a single coil 210 in a compounded manner is depicted. As shown in FIG. 2, instead of two coils of a typical electromagnetic flowmeter as shown in FIG. 1 a single compound coil 210 is provided. The single compound coil 210 is comprising two coils mounted on a surface of conduit 220 and excited by an excitation unit (not shown) for generating an electromagnetic field. Here, the first coil (outer coil) is placed such that its inner edge is adjacent to the outer edge of the second coil i.e. the second coil lies inside the first coil. The coils can be electrically connected to be in series to each other or in parallel to each other. A first coil 230 (outer coil) is concentrically positioned with a second coil 240 (inner coil) and the second coil 240 is placed within the surface area enclosed by the first coil 230. The electrode 140 (one electrode) is shown to be positioned in between the first coil 230 and the second coil 240, the other electrode (not shown in figure) is also positioned accordingly on the side not visible in the figure.

In an embodiment of the present invention the coils, i.e., the first coil 230 and the second coil 240 are arranged such a way that the overall performance of the electromagnetic flowmeter is unaffected (minimal change in performance). There is a resultant reduction in usage of material for the coils like copper and the signal strength is almost unaffected.

Figure 3:
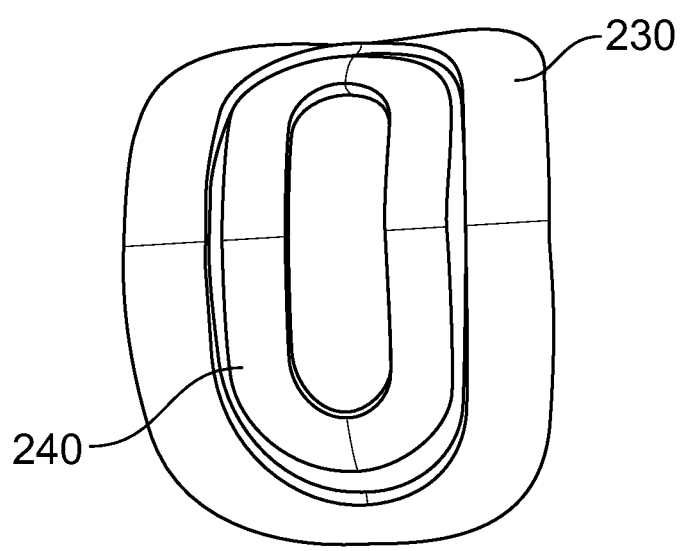
FIG. 3 depicts a front view of the coils of the electromagnetic flowmeter.

FIG. 3 depicts the EM flowmeter with the proposed compound coil configuration. As mentioned above there is a first coil 230 or the outer coil and enclosed within the first coil or outer coil 230 is the inner coil 240. The coils, first coil 230 and second coil 240 are arranged in a concentric manner comprised within a single unit of compound coil. The longer sides of the coils are close to each other. However, the shorter sides (towards the pipe extremes), have sufficient gap for the electrodes to be installed. Hence the electrodes are arranged in the gap between the first coil and the second coil as depicted in FIG. 1. Hence the electrodes are arranged linearly at a position above the central diameter of the conduit 220. Such a configuration results in saving coil material compared with that in the double coil configuration (as shown in FIG. 1). At the same time decrease in signal strength or performance level is negligible. It is to be noted that the shape of the coil can be different from that shown in the figures.

The electromagnetic flowmeter are provided with suitable power source and electronics circuitries for exciting the coils for producing electromagnetic fields for making potential difference measurements and display/transmitting the measured values. In an embodiment, the electromagnetic flowmeter can comprise a display for indicating the determined flow of fluid in the flow pipe.

In an embodiment, the electromagnetic flowmeter wherein the determined flow of fluid in the flow pipe (measured potential difference between the electrodes) is transmitted to a remote control center of the electromagnetic flowmeter for further analysis.

In an embodiment, the electromagnetic flowmeter is Internet of Things (IOT) enabled for providing remote controlling, better visibility of the working of the electromagnetic flowmeter, providing real time information to software systems and other surrounding IOT enabled systems.

The electromagnetic flowmeter described herein above comprises a processing device, an excitation unit, potential sensing electrodes, coils and a flow pipe or conduit through which fluids to be measured flow. The excitation unit is controlled by the processing device wherein the processing device is used for taking measurements from potential sensing electrodes. The coils are excited by the excitation unit wherein the power of excitation is controlled by the processing device. It may be known to the person skilled in the art that the processing device can internally calibrate the rate of flow of the fluid corresponding to the measured potential difference and results can be displayed or transmitted to a remote control centre for further analysis.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An electromagnetic flowmeter for measuring flow of fluid flowing in a conduit of the electromagnetic flowmeter, wherein the electromagnetic flowmeter comprises:

a pair of electrodes mounted on the conduit for measuring potential difference generated by the interaction of electromagnetic field in the fluid to determine the flow of fluid in the electromagnetic flowmeter;

a processing unit, wherein the processing unit acquires signals from the pair of electrodes and processes the signal for measurement; and at least one set of coils comprising at least two coils mounted on a surface of the conduit and excited by an excitation unit for generating an electromagnetic field, wherein the pair of electrodes are positioned between a first coil from the at least one set of coils and a second coil from the at least one set of coils, wherein the first coil is concentrically positioned with the second coil, the second coil being placed within the enclosed surface area of the first coil, wherein each of the first coil and the second coil has a minor axis and a major axis, and wherein each minor axis has a different length than each major axis.

2. The electromagnetic flowmeter as claimed in claim 1, further comprising an excitation unit to excite the at least one set of coils for generating an electromagnetic field that interact with the fluid passing through the electromagnetic flowmeter, wherein the excitation unit is controlled by a processing unit.

3. The electromagnetic flowmeter as claimed in claim 1, further comprising a display for indicating the measured flow rate of fluid.

4. The electromagnetic flowmeter as claimed in claim 1, wherein measured flow rate of fluid is transmitted to a remote control center of the electromagnetic flowmeter for storage or analysis.

5. The electromagnetic flowmeter as claimed in claim 1, wherein the pair of electrodes mounted on the conduit are arranged linearly above the central diameter of the conduit.

\* \* \* \* \*